Figure 1:
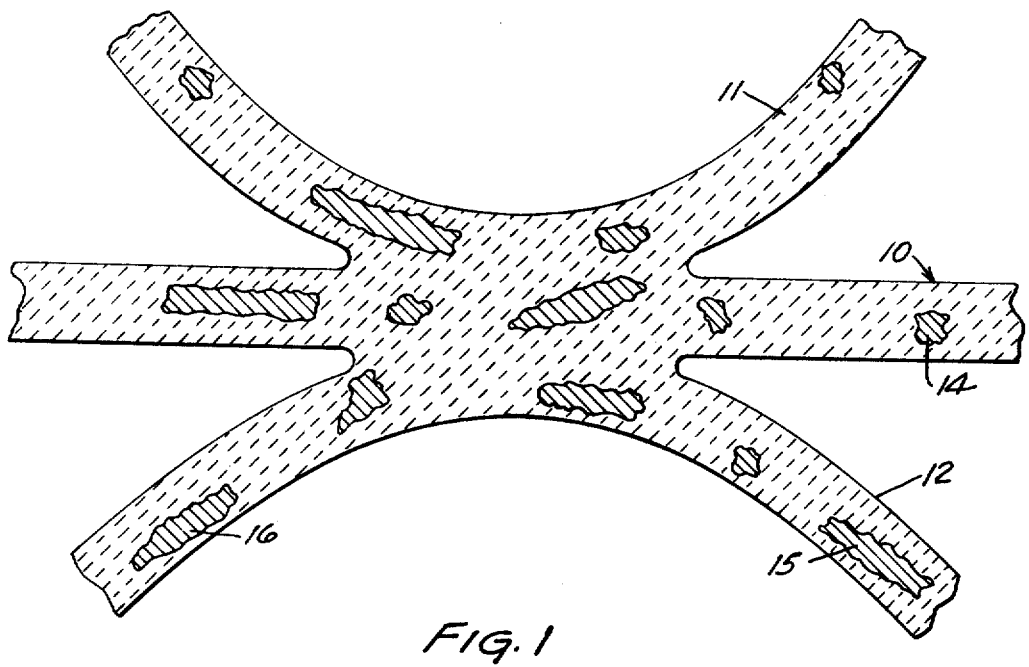

INVENTOR.
HAROLD G. SOWMAN
BY
Carpenter, Abbott, Coulter & Kinney
ATTORNEYS

INVENTOR.
HAROLD G. SOWMAN
BY
Frank A. Steldt
ATTORNEY

United States Patent Office 3,321,285
Patented May 23, 1967

3,321,285
MOLYBDENUM FIBER REINFORCED
ALUMINA
Harold G. Sowman, Maplewood, Minn., assignor to Minnesota Mining & Manufacturing Company, St. Paul, Minn., a corporation of Delaware
Continuation of application Ser. No. 25,900, May 2, 1960.
This application Nov. 12, 1964, Ser. No. 410,773
1 Claim. (Cl. 29—182.5)

This application is a continuation of my earlier filed copending application Ser. No. 25,900, filed May 2, 1960, and now abandoned.

This invention relates to ceramic structures and more particularly to ceramics containing metallic reinforcements.

While the ceramic art is very ancient it has continually been plagued by the fragility and frangibility of ceramic products. For this reason, it has often been attempted to reinforce ceramic articles by means of metallic wires or rods. Likewise the embedding of metallic electrical leads in glass or ceramic bodies is known  Reinforcement of ceramics by addition of metal powders has also been proposed, as well as the use of built-up shapes of alternate dense (worked) metal sheets and previously fired ceramic sheets. Composite bodies of ceramics and metals are thus well known to the art.

For many uses where reinforced ceramics would be of particular value, however, the art provides no convenient method of preparation, particularly for refractory metals which are not readily fabricated in forms, such as wire, suitable for the contemplated reinforcements. Cold pressing of ceramic powder containing metal wires produces green shapes which on firing are distorted and have protruding wires. Hot pressing of the green preforms improves the results obtained on firing wire-containing preforms, but hot pressing is practical only for the production of simple configurations, and is not considered to be an economical process.

It is an object of this invention to provide a process for the manufacture of reinforced ceramic articles. A further object of the invention is to provide ceramic articles reinforced with metallic filaments. Another object is to provide ceramics possessing significant reinforcement at elevated temperatures. A still further object of the invention is to provide ceramic objects having decreased frangibility. Other objects of the invention will become evident from the disclosure set forth hereinafter.

In accordance with the above named and other objects of this invention, it has been found that highly valuable reinforced ceramic structures are obtained when segments, of desired length, of a green reinforcing structure, formed, for example, by extrusion of a mixture of powdered metal and an organic binder, are incorporated into a ceramic mix and composite mixture is molded or otherwise formed to any desired shape, stabilized in green form and fired at a temperature sufficient to cosinter the metal and ceramic. As used herein, the term "green" as applied to intermediate shapes means an unfired structure in such condition that it can be handled.

The green reinforcing structures are produced by incorporation of a suitable metal powder, e.g., gold, iron, nickel, cobalt, chromium, columbium, titanium, zirconium, copper, tantalum, molybdenum, tungsten, beryllium or the like, including alloys, for example, stainless steel, Monel metal, Inconel and the like, in an organic binder, preferably a resinous or polymeric binder, in such an amount that the binder at least fills the voids between the metallic particles. Preferably, powdered metals in a state of division finer than 100 mesh are used, while metal powders having particles as small as a few microns in size, or less, can be used. Green metallic fibers of this type are readily available by using the methods described in U.S. Patent No. 2,593,943, but the extruded fibers therein described must be used directly and not fired before use. It is sometimes convenient to employ relatively higher melting binders such as polyacrylates and polymethacrylates without waxy constituents and extruded at higher temperatures, e.g., up about 300° C.  Since the strength of the green reinforcing means is largely dependent upon the polymeric binder, the fibers are readily cut or broken into any desired lengths, and it is found that even relatively short fibers or filaments contribute useful reinforcement while longer and even continuous filaments can be employed in special circumstances.

The reinforcing structure is commonly most conveniently produced in the form of a filament of more or less circular cross-section. However, flat strips, square cross-sections, or other irregular cross-sectional shapes can be employed.  It is found that after the firing of the composite green structures, the reinforcing means has been sintered to a continuous metallic filament, having approximately the same cross-sectional shape as the green structure.  The metal is sintered to dense form which is distinguished from that ordinarily employed as reinforcements or the like by being unworked, thus having random grain orientation, owing to having been sintered concomitantly with the ceramic material.  The surface of the metal is negative, or complementary, replicate of the grains or particles of ceramic which are located in contact therewith.  The irregular surface thus produced locks the reinforcement into the ceramic structure.  In addition, chemical reactions may occur between the ceramic and the metal which produce a metallic oxide at the surface of the reinforcing metal.  In any event, the reinforcing metal when produced by the process of the invention appears to be very firmly held and even may be said to be integrally bonded with the ceramic structure.

The general procedure for producing the reinforced ceramic embodiments of the invention is to mix suitable lengths and amounts of extruded green metallic reinforcing structures with the desired ceramic base, avoiding manipulations which will tend to deform the filaments to such an extent as will destroy their integrity.  A green article of the desired shape and size is then formed, for example using methods known in the art such as cold pressing, or by building up articles from sheets of green material as will be described hereinafter.  In general, the ceramic base is produced from any desired dry finely powdered ceramic material in admixture with an organic binder.  If any fluid is added to the ceramic base mixture, it should not be a solvent for the binder of the green metallic reinforcement, although it may cause some slight swelling with advantageous results since a tighter bond is then effected between the base and the filaments. The composite mixture is molded as by compression, and the molded article is dried if necessary, using normal precautions to avoid formation of gas bubbles or voids, and then fired.  Some care should be exercised in firing so that volatilization of the binder of the filaments does not occur too rapidly.  For this reason, when a fairly massive article is being processed, a prefiring sufficient to effect volatilization of the polymeric binder is followed by firing at the temperatures required to achieve actual sintering of both the ceramic and the metal.

The particles of the ceramic and metal tend to interlock in the green shape.  This is accentuated on firing because of the shrinkage of the whole structure, and the surface of the sintered metal takes on the characteristics of the ceramic grains, rather than remaining smooth as in the use of a drawn wire. Consequently, the resultant reinforcing metal is effectively keyed into and integrally bonded to the ceramic body itself. To a useful extent also, when the metal has a higher linear coefficient of thermal expansion than the ceramic material, on cooling the sintered shape to ambient temperature there is a development of tension in the metallic reinforcing means thus prestressing the resultant body to provide significantly great strength.

Firing of the stabilized intermediate green shapes preferably is conducted in an inert atmosphere to avoid chemical reactions involving the components of the shapes. While specific compositions of ceramics and metals may permit firing in nitrogen or even in air, it is preferable to employ helium or a vacuum as the atmosphere for sintering. A reducing atmosphere produced using hydrogen and the like may also be employed.

The sintering temperature employed is dependent upon the particular ceramic which is used and is the same as that employed in prior art techniques for sintering such ceramics, and thus need not be detailed here. Likewise, the duration of sintering depends to an extent upon the size and heat-transfer characteristics of the ceramic, as well as the final density which is desired, as is well known in the art.

The choice of a particular ceramic base and the specific metal for reinforcement will be dependent upon the particular purposes for which the finished structure is desired. The ceramic powder is, like the metal powder, used in finely divided form ranging from −100 mesh to a few microns in size.

As is known, the green articles shrink on firing and therefore are made larger than the finished article in proportion to the amount of shrinkage expected. This can best be determined empirically before construction, by the use of test samples of known dimensions.

For high temperature applications, molybdenum reinforcements may be used with an aluminum oxide base containing, if desired, small amounts of mill additives. Other combinations of metals and ceramics include thorium oxide with niobium, thorium oxide with molybdenum and the like.

The reinforced ceramic structures of the invention can also be produced for primarily decorative purposes. Thus, a very interesting and decorative porcelain can be produced using a porcelain base ceramic green mix with very fine gold filaments embedded in it as described. The gold reinforcement in the green state can be introduced in short lengths oriented randomly or the fine filament may be applied externally to the green undried ceramic base structure in a mold in any artistic way. After firing, the article may be ground or otherwise worked to greater than usual thinness or otherwise sculptured and the exposed gold polished before glazing. By this process reinforced ceramic ware having most unusual effects can be produced using any desired metal and ceramic base.

In another embodiment of the invention, the green metallic filaments are allowed to extend transversely through a relatively thick ceramic sheet. Many such filaments of relatively fine diameter, or a few or even one such filament of relatively large diameter can be used. When fired, the resultant ceramic plate contains metal wires extending therethrough, which may serve for conducting electricity through the insulating ceramic sheet. Thus, if desired, electrical connections may be attached to such wires. In a similar embodiment the green wire and green ceramic base are simultaneously coextruded in such a way that the green ceramic base coats the central green filament uniformly. In this way an emissive coating over a tungsten wire can be produced to form an indirectly heated cathode for electron tubes.

In addition to other useful characteristics, the finished reinforced ceramic possesses a higher thermal coefficient than the ceramic alone, which increases its value for use in heat exchangers and the like.

Among the applications to which the ceramic structures of the invention are well adapted, for example, are firebrick, crucibles, furnace linings and the like, where the increased strength and resistance to spalling and fracture are particularly valuable. The encapsulation of the metallic reinforcement by the ceramic base protects the metal from effects of high temperature atmospheres. For example, the oxidation of molybdenum which occurs readily at high temperatures is greatly reduced or even eliminated when the metal is fully encased in a dense ceramic as in the structure of the present invention. However, if the ceramic shape which is produced on sintering is porous a glaze can be applied to the exterior surfaces and fired therein to provide an impervious coating so that the reinforcing metals will not be oxidized when the article is used at high temperatures in air.

The amount of metallic reinforcing means to be incorporated in the ceramic structure may range from a few percent by weight upward to 25 percent or more, depending upon the particular purpose intended. When maximum strength is desired the amount of metal reinforcement used, for example, filaments, may be of the order of 90 percent by weight of the article. However, a much smaller percentage content is usually sufficient to provide useful reinforcement of the ceramic structure and simple engineering calculations on expected stresses will serve to determine the amount of metallic filaments or the like which should be incorporated and whether random distribution or ordering in some particular manner is most desirable. In general, it will probably be useful to determine by trial the strength of exemplary systems where crucial significance must be attached to extreme strengths, since the number of variables which the skilled worker will want to control in the preparation of the specimen may thus be evaluated more readily. For example, the tensile strengths of the individual metallic reinforcing structures employed will deviate from known values for drawn metal wires, not only because the reinforcing means will not have been cold worked, but because of effects brought about by the nature of the ceramic, such as adhesion and chemical compound formation as well as possible pressure or other effects on the original cross-sectional area.

Generally speaking, any metal (including alloys in this term as used herein) which can be obtained in powder form can be used to form the green reinforcing structure. As noted hereinabove, metals of high melting point will be most useful for the production of articles which are to be used under conditions of high temperature. The particular metal which is selected for reinforcement of a given ceramic depends to some extent on the sintering temperature of the ceramic materials used. Thus, the metal which is selected should have a melting point at least somewhat higher than the sintering temperature of the ceramic which is to be used, and should itself sinter well at this temperature. However, where the ceramic used becomes dense or is not wetted by the metal when the latter is molten, sintering temperatures above the melting point of the metal can be employed.

The ceramic materials which can be employed in the structure of the invention may be chosen from the great number available to the ceramic art such as clays, alumina, zirconia, thoria, beryllia, titania and the like, as well as combinations of materials designed to provide particular properties in the finished article such as predetermined values of thermal co-efficient of expansion, electrical properties or the like.

The binders employed in preparing the green structure can be any of numerous materials available to the art. If organic in nature, it is desirable that the binders be of a type that will volatilize readily on firing without producing large volumes of gases or reacting with the metals or ceramics employed, and without leaving undesirable residues in the fired structure. Thus, organic binders such as vegetable gums, natural resins, polysaccharides and the like naturally occurring substances, and synthetic materials such as polymers, resins and the like can be employed. These should be free from halogens, sulfur or the like reactive groups or ions. Examples of the organic binders which can be used include starch, gum acacia, rosin, methyl cellulose, cellulose acetate, polymethyl-methacrylate, polystyrene, polyvinyl alcohol, polyvinyl acetate and the like. These are used with an appropriate solvent which is sufficiently volatile to permit removal under moderate conditions before firing, so as to produce a dry manipulatable green structure. Mill additives such as wetting or suspending agents and the like can be used if desired.

The purpose of the binder used in the green shapes is to provide sufficient strength for handling the structures in the green state and an amount suitable to accomplish this result is all that is required.

The choice of organic binder is governed largely by the fabrication means selected and the effects desired. Methyl cellulose in water solution provides an excellent binder when rolling of sheets or extrusion of filaments is necessary and hence is particularly useful for production of wire reinforcements, or flat strip means which are cut from sheets. However, generally speaking, for such purposes, polymers which form mixtures with solvents or plasticizers and powdered metals or ceramics, which mixtures are sufficiently plastic to be extrudable, can be used similarly. When sheets are to be formed by coating, the binder should possess a sufficiently high solubility in some solvent so that excessive dilution of the mixture is not necessary. For this purpose polymers are generally useful which can find use in coating compositions, such as the tetrapolymer described in the examples hereinbelow. The polymeric binders may be thermosetting or thermoplastic, and are preferably at least somewhat flexible at ordinary temperatures.

Inorganic binders can be employed for producing the green ceramic base material. Such binders include soluble silicate, silica gel, aluminum hydrogen phosphate and the like.

As pointed out hereinabove, the solvent used in the preparation of the green ceramic shape preferably should not completely dissolve the binder which has been employed for the green metallic shapes. This is conveniently accomplished, for example, by using a water-insoluble, organic solvent-soluble binder for the green metallic reinforcement and a water-soluble, organic solvent-insoluble binder for the ceramic base, where a slurry is used to form the ceramic powder into the desired intermediate green configuration. In a typical case, the metal powder is bonded with carboxymethylhydroxyethyl cellulose, using water as a solvent, extruded in the proper shape and dried, while the ceramic slurry into which the reinforcements thus produced are incorporated uses polystyrene as a binder and toluene as a solvent.

A ceramic base mix solvent in which the binder of the green metallic reinforcement is soluble can be used if the mixing period is kept short and the amount of solvent in the ceramic base mix is kept to the minimum.

The following examples, in which all parts are by weight unless otherwise specified, will serve to illustrate the reinforced ceramic products of the invention and the process for the production in more specific detail.

*Example 1*

A slip of 30 parts of powdered molybdenum metal (—325 mesh) and about 3 parts of an acrylate binder (a tetrapolymer formed by the polymerization of a mixture of monomers containing about 30 percent octadecyl acrylate, 30 percent acrylonitrile, 35 percent cyclohexyl acrylate and 5 percent acrylic acid) is prepared by grinding these in a mortar with a mixture of equal volumes of nitroethane and ethoxyethyl acetate in sufficient amount to give a somewhat tacky mixture. The tetrapolymer is more conveniently used as a solution in the same solvent mixture, 7 parts of a 43 percent solution being employed. Thin fibers can be produced from this mixture on a small scale by pulling them from the body of the mass using a rod or other means dipped into the mixture and then withdrawn to a distance commensurate with the desired thickness of the filaments. It is equally satisfactory to employ a somewhat stiffer mixture, which contains less solvent, extruding this through a die under pressure, for preparation of larger quantities. The fibers are dried by thoroughly removing the solvent and cut into pieces, about 0.05 to 0.3 inch long.

A ceramic base is prepared by mixing 30 parts of alumina of —325 mesh with about 1.5 parts of the same acrylate binder in sufficient amount of the same solvent mixture to give a suspension that can be poured. The resulting slurry is cast as a sheet and dried. The dried sheet is pulverized to —50 mesh to provide the ceramic base having the organic binder intimately incorporated therein.

A dry mixture of 8 parts of the alumina ceramic base and 2 parts of the above filaments is prepared by blending in a jar by rolling on mill rollers and the mixture is cold-pressed in a mold under about 10,000 p.s.i. to form pellets about ½ inch long and ½ inch in diameter. The pellets are fired at 1650° C. for 30 minutes in a hydrogen furnace, using a molybdenum boat. There is about 15 percent shrinkage. The fired pellets show remarkable strength owing to the reinforcing action of the molybdenum, and have improved thermal conductivity. They are suitable for use as a high temperature catalyst support, or as a spacer in firing ceramic ware. Cross-sectioning the pellets reveals that randomly oriented molybdenum fibers are present, none of which protrude beyond the surface.

Upon examination of the cross-section under moderate magnification, it is readily seen that the metal reinforcing wires formed by sintering have a continuous sintered structure and rough surfaces which are complementary to and in substantially continuous contact with the grains of the ceramic. There is no separation between the wire and the ceramic.

When preformed drawn molybdenum wire is employed instead of the sinterable filaments used above, the pellet is found after firing to be weakened by cracks, while ends of the wire protrude from the surface at numerous points.

When the procedure of this example is repeated, using uranium oxide (—325 mesh) in place of the alumina powder (and using about 0.75 part of the acrylate binder), firing at about 1700° C., there are obtained reinforced pellets suitable for use as fuel elements in atomic reactors.

*Example 2*

A green molybdenum reinforcing filament is prepared by thoroughly kneading a mixture of 37.5 parts of molybdenum powder (—325 mesh) and 16.7 parts of a gel consisting of 85 percent water and 15 percent methylcellulose, followed by extruding the plastic mass through a steel die having a 5-mil diameter circular orifice. The filament dried rapidly in air on extrusion. As extruded (and still containing water) the filament is flexible and can be bent around a ⅛" diameter rod. It is conveniently wound on a drum about 8 inches in diameter for storage. For use, the green filament is cut into pieces about 0.1 to 0.3 inch long. It is still flexible after substantially completely drying on standing, through less so than previously.

A slurry is prepared by ball milling for 16 hours 88 parts of alumina powder (—325 mesh), 15 parts of granular polystyrene, 4.5 parts by volume of dioctyl phthalate (as a plasticizer) and 40 parts by volume of a mixture of equal volumes of nitroethane and ethoxyethyl acetate. To the slurry are then added with careful mixing 8.5 parts of the small cut pieces of the green molybdenum filament prepared above to produce a composite slurry in which the small green reinforcing filaments are uniformly distributed. It will be noted that in this example the two ingredients are bonded with polymers which are of different types so that the solvent of the alumina slurry will not liquefy the binder in the green molybdenum filaments, although capable of moistening and softening it.

The composite slurry is knife coated on a suitable non-adherent backing such as aluminum foil or polyethylene coated paper to a thickness of 30 mils and is then dried by removal of solvent to a sheet about 15 mils thick. This sheet is sufficiently strong to be handled after removal from the backing or, if desired, the backing may be retained while the sheet is cut into strips 1¼ inches wide. Half of these strips are then corrugated by passing between mating rollers heated to about 250° to 300° F. which impose a corrugated pattern of about 8 grooves per inch. The corrugated pattern is retained by the cooled strips. When aluminum foil backing is employed it may be retained during the corrugating operation and serves to further assure support of and retention of the corrugated shape since it is inelastically deformed by the rollers. When other backings of a more elastic type such as polyethylene coated paper are used, they are desirably removed before corrugation.

A honeycomb assembly is made by combining alternate layers of corrugated and flat sheets using some of the original alumina slurry which contains none of the reinforcing filaments painted on the surfaces to promote adhesion. The assembly is dried to form a stable green structure which can be manipulated. Thereafter, it is fired by heating in a hydrogen atmosphere at 1650° C. for about one hour. The furnace and the assembly are heated to this temperature over a period of about 4–5 hours, and following sintering the dense ceramic structure is allowed to cool with the furnace, although it is quite shock-resistant and can be removed immediately. The fired assembly is cooled and found to be a very strong honeycomb. Sections of the honeycomb show random distribution of reinforcing wires running parallel to the planes of the surfaces. Such a reinforced honeycomb is useful for the construction of structural insulating materials for use at high temperatures. The dimensions of course can be increased particularly as respects area, to produce shapes of any size up to the capacity of sintering furnaces which are available.

Sheets of green molybdenum reinforcing material are prepared by knife-coating a mixture prepared as follows on polyethylene coated backings.

A slurry is prepared from 98 parts of molybdenum powder (−325 mesh) and 2 parts of the tetrapolymer described in Example 1 diluted to a thick creamy consistency with a mixture of equal parts of nitroethane and ethoxyethyl acetate solvent.

The slurry is knife-coated about 25 mils thick on the supporting sheet and dried in the air until substantially free from solvent. This stabilized green sheet is then cut into strips about 62.5 mils wide and then are further divided into random lengths of one-half to one inch in length. The narrow strips thus produced are used to provide reinforcements for alumina shapes of somewhat larger dimensions than set forth above, but are used in the same manner as shown. After firing, cross-sectioning of the reinforced ceramic discloses that the metallic structures produced by sintering retain their general shape but the surfaces are rough and complementary to the sintered grains of ceramic.

Figure 2:
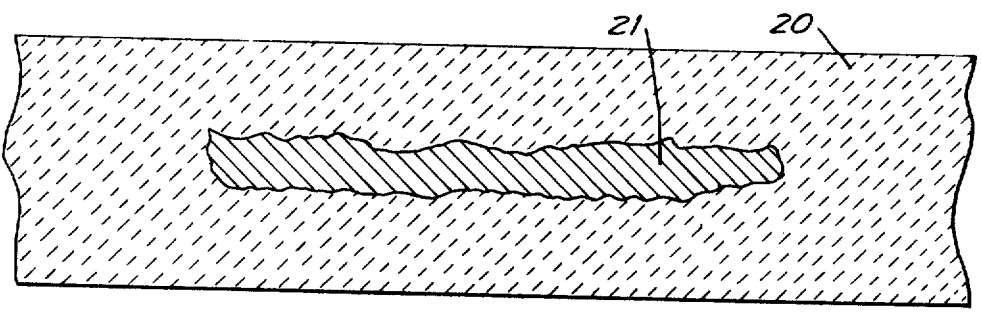

The reinforced ceramic structures of the invention are further illustrated by reference to the accompanying drawings, in which FIGURE 1 represents a cross-sectional, enlarged view of a portion of a fired, metal-reinforced ceramic honeycomb assembly made by combining alternate layers of corrugated and flat sheets as set forth hereinabove in Example 2. FIGURE 2 shows, in cross-section, a fired alumina sheet reinforced with molybdenum strip, also as set forth hereinabove in Example 2.

In the drawings referring to FIGURE 1, 10 is a flat reinforced alumina sheet to which corrugated alumina sheets 11 and 12 are joined as set forth in Example 2. One such junction of the sheets at the ridges of the corrugations is shown. The structure is shown after firing. At 14 there is shown a transverse cross-section of an elongated wire-like molybdenum reinforcement embedded in the ceramic sheet, while 15 and 16 are such wire-like molybdenum reinforcements, in cross-section along their long axis and on an angle across the long axis, respectively.

Referring to FIGURE 2, 20 is a fired alumina sheet in cross-section, embedded in which there is shown, also in cross-section, a flat strip of molybdenum 21 which is formed by sintering a green strip of powdered molybdenum with a binder, in situ, as described hereinabove.

The drawings illustrate useful relative dimensions of the reinforcing means and the ceramic bodies, but the absolute dimensions of the drawings are not to scale. The particular views shown are enlarged views of ceramic structures utilizing thin films of alumina.

Figure 3:
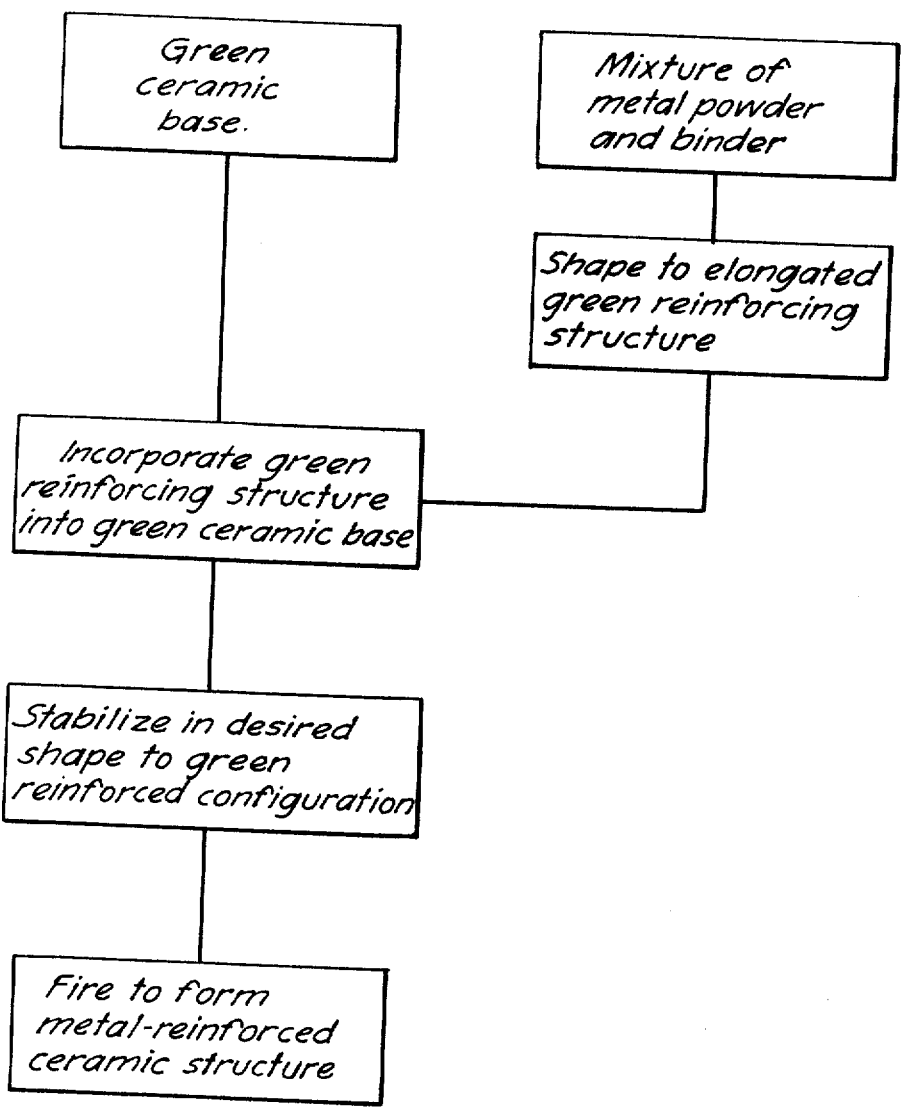

In the drawings, FIGURE 3 is a flow sheet showing the various steps employed in carrying out the process of the invention.

Figure 4:
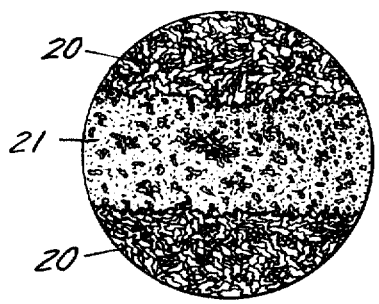

FIGURE 4 is an enlarged view, in cross-section, of a part of the ceramic sheet and metallic reinforcement of FIGURE 2. In FIGURE 4, 20 represents the ceramic portion of the sheet, showing grain structure, while 21 represents the metallic, wire-like reinforcement material, likewise showing grain structure. The interface between metallic reinforcement 21 and ceramic 20 is seen. The surface of the reinforcement means conforms to and is in continuous contact with the irregular grain structure of the ceramic, and positively mechanically interlocks the reinforcement means with the ceramic over the entire surface of the reinforcement.

Other combinations of ceramics and reinforcing metals which can be employed in the manner set forth hereinabove are thorium oxide with molybdenum, niobium, tungsten, nickel, stainless steel, chromium and the like powdered metals; uranium oxide with molybdenum, niobium, tungsten, nickel, chromium and the like powdered metals; as well as zirconium oxide with the same powdered metals used to form the green shapes. Somewhat less refractory reinforced bodies are formed by employing steatite, cordierite or china clay as the ceramic, with copper, silver, brass, iron, platinum or the like as powdered metals to form the green reinforcements. Vitreous silica can likewise be employed as the ceramic base, using nickel, chromium, molybdenum and the like powder to form the green reinforcing means.

What is claimed is:

A sintered ceramic structure consisting essentially of alumina and containing a multiplicity of elongated, discrete, independent wire-like sintered molybdenum reinforcement means of predetermined size and of relatively elongated shape about 5 mils to 60 mils in smallest dimension and about 50 mils to 1 inch in length, randomly dispersed and embedded throughout the said structure, and having random grain orientation characteristic of sintered molybdenum powder, and the surface of said reinforcement means conforming to and being in continuous contact with the irregular, random alumina grain structure in contact therewith to positively interlock mechanically each of the said molybdenum reinforcement means with the alumina over the entire surface of each of said reinforcement means.

References Cited by the Examiner

UNITED STATES PATENTS

| | | | |
|---|---|---|---|
| 2,637,890 | 5/1953 | Ramsay | 264—60 |
| 2,654,912 | 10/1953 | Burchenal | 264—60 |

(Other references on following page)

UNITED STATES PATENTS

| | | | |
|---|---|---|---|
| 2,789,341 | 4/1957 | Youssov | 29—182.5 |
| 2,894,319 | 7/1959 | Thomson | 29—182.5 |
| 2,906,007 | 9/1959 | Bibbins. | |
| 3,047,383 | 7/1962 | Slayter | 29—182.5 X |
| 3,101,527 | 8/1963 | Weinman et al. | 29—182.5 |
| 3,153,279 | 10/1964 | Chessin. | |
| 3,240,563 | 3/1966 | Mercuri | 23—191 |
| 3,285,825 | 11/1966 | Jens | 176—68 |

OTHER REFERENCES

"Fiber Metallurgy," Metcalfe et al., Metal Progress, March 1955, pp. 81–84.

"Fiber Metals," Metcalfe et al., Materials and Methods, November 1955, pp. 96–98.

CARL D. QUARFORTH, *Primary Examiner.*

L. DEWAYNE RUTLEDGE, *Examiner.*

R. L. GRUDZIECKI, *Assistant Examiner.*